(12) United States Patent
Dehmlow et al.

(10) Patent No.: US 9,482,803 B2
(45) Date of Patent: Nov. 1, 2016

(54) INTEGRATED FILTER AND GRATING IN AN AIMING SIGHT

(71) Applicant: L-3 Communications Corporation, Warrior Systems Division - EOTech, Ann Arbor, MI (US)

(72) Inventors: Brian Paul Dehmlow, Pinckney, MI (US); David Edwin Ventola, Avon, MA (US); Zbynek Ryzi, Littleton, MA (US)

(73) Assignee: L-3 Communications, Warrior Systems Division, EO Tech, Inc., Ann Arbor, MI (US)

( * ) Notice: Subject to any disclaimer, the term of this patent is extended or adjusted under 35 U.S.C. 154(b) by 56 days.

(21) Appl. No.: 14/274,057

(22) Filed: May 9, 2014

(65) Prior Publication Data

US 2016/0003996 A1    Jan. 7, 2016

(51) Int. Cl.
| G02B 5/32 | (2006.01) |
|---|---|
| G02B 23/14 | (2006.01) |
| G02B 5/18 | (2006.01) |
| F41G 1/30 | (2006.01) |

(52) U.S. Cl.
CPC . *G02B 5/32* (2013.01); *F41G 1/30* (2013.01); *G02B 5/18* (2013.01); *G02B 23/14* (2013.01)

(58) Field of Classification Search
None
See application file for complete search history.

(56) References Cited

U.S. PATENT DOCUMENTS

| 5,139,335 A | 8/1992 | Lundeen et al. |
|---|---|---|
| 5,483,362 A | 1/1996 | Tai et al. |
| 5,539,544 A * | 7/1996 | Le Paih ............ A61F 9/022 359/15 |
| 5,815,936 A * | 10/1998 | Sieczka ............ G03H 1/00 359/1 |
| 6,490,060 B1 | 12/2002 | Tai et al. |
| 8,107,073 B2 | 1/2012 | Norton et al. |
| 2010/0328743 A1 | 12/2010 | Wolterink et al. |
| 2011/0228366 A1 | 9/2011 | Liu |

FOREIGN PATENT DOCUMENTS

| CN | 202421613 U | 9/2012 |
|---|---|---|
| WO | 9530179 A | 11/1995 |

OTHER PUBLICATIONS

International Search Report and Written Opinion, International application No. PCT/US 15/30074, mailed Jan. 27, 2016.

* cited by examiner

*Primary Examiner* — Jennifer L. Doak
(74) *Attorney, Agent, or Firm* — Brooks Kushman P.C.

(57) ABSTRACT

A holographic sight is provided having a housing that includes a plurality of holograph sight components. A laser diode mounted in the housing is configured to emit a laser light beam. The light beam is transmitted to an integrated diffraction grating and filter unit which includes a grating and a filter in a single device. The diffraction grating has a grating surface for diffracting the light beam and also diffracting unwanted ambient light transmitted into the housing. The filter is an optical filter contacting at least a portion of the grating. The optical filter is adapted to absorb at least one wavelength of the ambient light to inhibit the ambient light from diffracting into a visible spectrum that might otherwise be viewable to a user looking into the holographic sight.

18 Claims, 10 Drawing Sheets

INTEGRATED FILTER AND GRATING IN AN AIMING SIGHT

TECHNICAL FIELD

The present disclosure relates to components within a holographic sighting device preferably for use on firearms.

BACKGROUND

There are several types of sights utilized with small arms, such as rifles, shotguns, hand guns, bows, and other similar, hand-held weapons.

One type of sight known in the art is a holographic sight. In a holographic sight, a laser beam of light is transmitted through a housing and is reflected one or more times until an aiming reticle image is generated by a hologram element. Diffraction gratings can be implemented in these and other types of optical sights. The diffraction grating spatially directs light in the laser beam as the wavelength changes with temperature. The Lightweight Holographic Sight disclosed in U.S. Pat. No. 6,490,060 issued to Tai et al. describes a compact and lightweight design of a holographic sight includes a grating that can also rotate in two axes to adjust light reflected from the grating and shift the aiming reticle.

Some prior gratings are inherently angle- and wavelength-selective, but lack environmental durability. For example, emulsion-based holographic volume phase gratings (VPGs) can be designed and constructed to diffract a single primary order into a very specific direction. Other prior gratings are inherently durable, but lack angular and wavelength selectivity. For example, ruled metal-on-glass gratings and metal-on-epoxy replicated gratings are capable of diffracting over wide ranges of wavelengths, including multiple orders of each input wavelength. Each output angle may include primary and higher diffraction orders unless order-sorting filters are added to the optical path. It is therefore desirable to combine wavelength selectivity and durability within a single grating technology.

Unfiltered ambient light might enter the housing of the optical sight. This unwanted ambient light can sometimes disrupt the view of the reticle image. This is at least partially due to the ambient light diffracting and reflecting back to the user, causing a visible spectrum of light (i.e., a rainbow) or bright mirror reflections. It is thus desirable to provide a weapon sight that reduces negative effects of ambient light (such as glare) without increasing the size of the sight. It is also desirable to improve existing weapons sights to reduce the negative effects of ambient light while considering the cost, weight, and number of parts in the sight.

SUMMARY

In one embodiment, a holographic weapons sight comprises a reticle image hologram and an integrated grating and filter device. The integrated grating and filter device includes a base substrate and a transparent substrate spaced from the base substrate. A first epoxy is between the substrates and contacts the base substrate. The first epoxy includes an outer surface having a series of surface features molded thereon. A reflective coating contacts the outer surface of the first epoxy and is configured to diffract light toward the hologram. A dyed epoxy is between the reflective coating and the transparent substrate. The dyed epoxy is adapted to inhibit at least a portion of the light from reflecting to the hologram.

The surface features, the reflective coating, and the dyed epoxy may each include a series of ridges and grooves, wherein the ridges and grooves of the reflective coating contact the ridges and grooves of both the transparent epoxy and the dyed epoxy.

The dyed epoxy may be dyed red and may be adapted to inhibit light having a wavelength of approximately less than 575 nm from passing through the dyed epoxy.

The dyed epoxy may also be died green and may be adapted to inhibit a light having a wavelength of approximately 475 nm-610 nm from passing through the dyed epoxy.

The reflective coating may be a layer of metal, such as aluminum, and the base substrate and first epoxy may be transparent.

In another embodiment, a holographic sight comprises a laser diode, a diffraction grating, and an optical filter. The laser diode is configured to emit a light beam. The diffraction grating has a grating surface configured to diffract the light beam toward the hologram, but also diffract ambient light. The optical filter contacts at least a portion of the grating surface and is adapted to absorb at least one wavelength of the ambient light.

The optical filter may directly contact the grating surface of the diffraction grating. Alternatively, the optical filter may indirectly contact the grating surface while being integrated with the grating surface.

The optical filter may be arranged in the sight such that it absorbs the at least one wavelength of ambient light prior to the ambient light ever transmitting to the grating surface of the diffraction grating. In such an embodiment, all ambient light must pass through the filter before reaching the grating.

The diffraction grating may include a layer of epoxy and a layer of a reflective metal bonded to at least a portion of the epoxy.

The epoxy may include a series of molded ridges and grooves directly contacting the layer of reflective metal. The optical filter may include a dyed-epoxy directly contacting the layer of reflective metal opposite the epoxy. The optical filter and the diffraction grating may be disposed between opposing layers of glass.

In yet another embodiment, a holographic sight comprises a laser diode for emitting a light beam, a collimator that collimates light emitted from the light beam, a reflective diffraction grating having a grating surface for diffracting the collimated light, and a filter contacting at least a portion of the grating surface.

The reflective diffraction grating and the filter may be integrated into a unitary device.

The filter and grating may be bonded to one another in which a dyed transparent material acting as the filter is bonded to a first glass substrate and to the reflective diffraction grating which includes a molded epoxy bonding a layer of reflective material to a second glass substrate.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
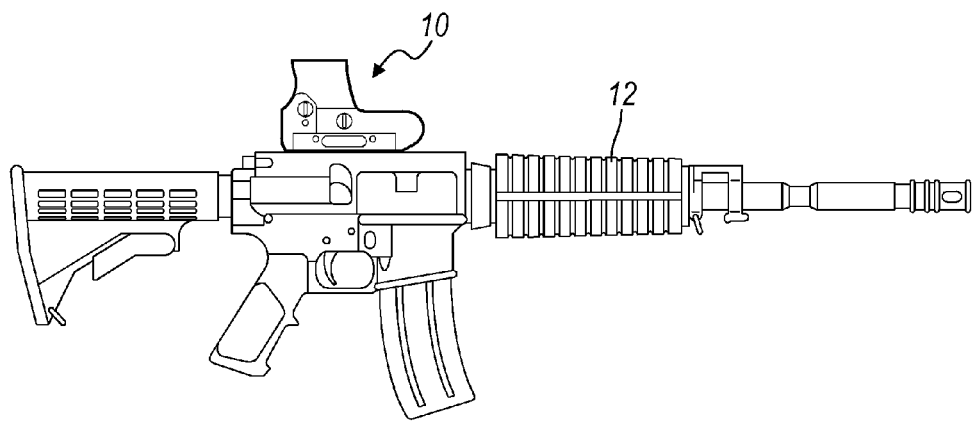
FIG. 1 is a plan perspective view of a holographic sight mounted on a rifle.

Referring to FIG. 1, one embodiment of holographic weapons sight, generally indicated by 10, is shown mounted on a weapon 12. The weapon 12 is shown as an M4 rifle, however it should be understood that the weapon may be other arms, including, for example, rifles, shotguns, handguns, grenade launchers, bows, or any other such handheld or vehicle-mounted weapon. For example, the sight 10 may include certain components disclosed in U.S. Pat. No. 6,490,060 issued to Tai et al., directed to a Lightweight Holographic Sight, the disclosure of which is incorporated by reference herein. It is also contemplated that the sight 10 may be mounted on other non-weaponry devices in which a user aims the device in a specific direction. For example, the sight 10 may be utilized with astronomical telescopes, terrestrial survey equipment, RADAR/LIDAR guns for law enforcement agents, Crew Optical Alignment Sights (COAS) for spacecraft pilots, cameras, search lights, stage lighting, highly directional microphones. Other such embodiments are contemplated and should be considered within the scope of the present disclosure.

Figure 2:
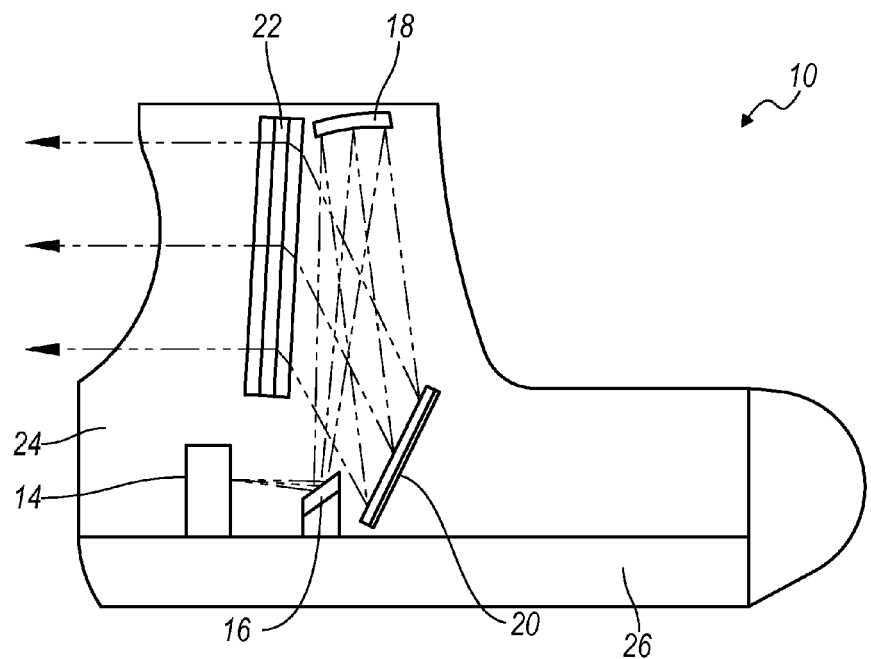
FIG. 2 is a schematic side view of the holographic sight illustrating the layout of optical components and the path of light through the sight.

Referring to FIG. 2, the holographic sight 10 is illustrated including optical components and an optical path of light that reflects off the optical components. The sight 10 includes a laser diode 14 that produces a beam of light in a diverging manner. The laser beam reflects or "folds" generally upward from a folding mirror 16 toward a reflective collimator 18. The light beam becomes collimated (i.e., parallel or non-diverging) after it is reflected off the collimator 18 and is directed generally downward toward a holographic integrated grating and filter device 20, the components of which will be discussed further below. The integrated grating and filter device 20 diffracts the laser light generally upward to a hologram 22, which is recorded with a projected image of a reticle pattern. The reticle image is then viewable by a user looking through the hologram. The diode 14, mirror 16, collimator 18, integrated grating and filter device 20, and hologram 22 are all mounted within a housing 24 secured to an integral or separate base 26. The arrangement of the components within the sight 10 is merely exemplary, and other arrangements and configurations known in the art are considered to be within the scope of the present disclosure.

It should be noted that terms "vertical," "horizontal," "upward," and "downward" are used herein to describe relative locations and direction based upon an assumption that the holographic sight is mounted for use where the longitudinal axis of the base 26 and the path of the reticle pattern extend in a horizontal direction.

According to the present disclosure, a filter is integrated with the grating as part of a unitary component to diffract the light from the laser diode 14. The grating and filter being integrated, as opposed to separated, provides a variety of advantages. For example, the integrated grating and filter reduces the spaced occupied in the housing 24 by the filter(s) and grating(s), reduces the number of optical elements required in the sight 10, reduces the weight of the sight 10, and reduces the assembly cost of the sight 10. The integrated grating and filter also simplifies the alignment of the optical components and reduces reflective losses that might otherwise be realized between a separated grating and filter. Additionally, when the filter is in (direct or indirect) contact with the grating, the filter can serve as a protective layer by inhibiting damage to the grating.

The integrated grating and filter device 20 is particularly useful in inhibiting stray or ambient light from interfering with covert usage of the sight. For example, sunlight that enters the housing 24 may reflect off of the grating, creating a visible specular reflection that can interfere with the user's vision when looking through the sight, or causing spurious reflections visible to an adversary or prey. By integrating a filter with the grating in a compact unitary structure, the sunlight can be filtered directly at the grating such that excess spectrum is inhibited from reflecting from the grating.

Figure 3:
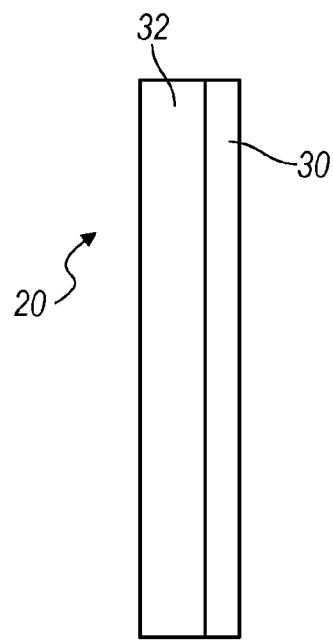
FIG. 3 is a cross-sectional schematic of a grating with an integrated filter according to one embodiment.

FIG. 3 illustrates such a grating and filter integral in a single device, shown schematically at 20. The filter and the grating are generally indicated by 30 and 32, respectively. The filter 30 is shown in FIG. 3 as directly contacting the grating 32 in which at least a portion of the filter 30 directly touches at least a portion of the grating 32. However, it should be understood that indirect contact between the filter 30 and the grating 32 is also contemplated, in which an intermediate material (e.g., adhesive, oil, glass, ceramic) is provided between the filter 30 and the grating 32 in a sandwich arrangement, or the like. The intermediate material may help to bind or otherwise adhere the filter 30 to the grating 32. Both indirect contact and direct contact between the filter 30 and the grating 32 are contemplated and both embodiments are intended to be within the scope of what is mean by "contact" between the filter 30 and the adjacent grating 32.

Figure 4:
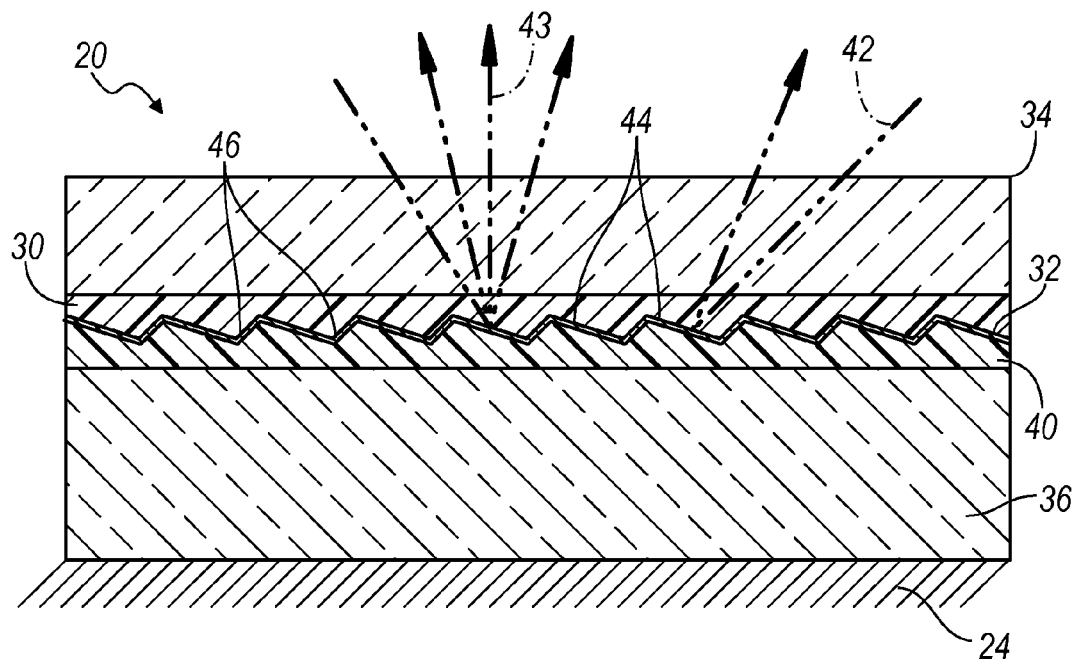
FIG. 4 is a detailed schematic illustration of the integrated grating and filter according to one embodiment."

Referring to FIG. 4, a detailed schematic of the integrated grating and filter device 20 is illustrated. A first layer or outer layer of glass 34 provides a cover to the filter 30. A second layer or inner layer of glass 36 provides a boundary opposite the outer layer of glass 34 such that the filter 30 and grating 32 are sandwiched between the two layers of glass. The inner layer of glass 36 is mounted or otherwise secured to a portion of the housing 24 or another component therein.

The grating 32 and the filter 30 are disposed between the two layers of glass 34, 36. The grating 32 may be, for example, a thin aluminum film or coating. A layer of (preferably clear) two-part epoxy 40 bonds or adheres the grating 32 to the inner layer of glass 36. Opposite the clear epoxy 40 from the grating 32 is the integrated filter 30. The filter 30 may be a dyed or colored (e.g., red) two-part epoxy. The grating selectively diffracts and reflects incoming laser light 42 while the colored-dyed epoxy filter 30 filters the reflected and diffracted laser light 42 and ambient light 43 to allow only a narrowed range of wavelengths of light to deflect away from the integrated grating and filter unit 20 (as will be additionally described with reference to FIGS. 5-12).

The diffraction grating 32 can be of any type suitable for a holographic sight. Diffraction is achieved by a plurality of periodic grating features that are regularly spaced apart. As shown in FIG. 4, the grating 32 has grating features, including a series of regularly spaced ridges 44 and grooves 46. This is but one example, and the grating 32 may include any suitable type of grating features known in the art for diffracting the incoming light. For example, in some embodiments, the grating 32 can include a plurality of substantially linear periodic grating features and/or a plurality of curved grating features. The grating include a variety of shapes, including triangular, sinusoidal, square, rectangular, etc. The grating features of the grating 32 can correspond to opaque, periodic (or quasiperiodic) rulings arranged within a transparent substrate, or can correspond to a plurality of domains with different indices of refraction, as might be observed in a volume phase diffraction grating.

The filter 30 can also be of any type suitable for a holographic sight. The filter 30 is an order-sorting filter configured to transmit at least a portion of the incoming light incident upon the filter 30 and absorb and/or reflect away at least another portion of the light incident upon the filter 30. In some embodiments, the filter 30 is an absorption filter that absorbs one or more particular wavelengths of light such that those wavelengths are not transmitted through the absorption filter. In certain embodiments, the absorption filter includes an absorptive medium, which generally refers to the spatial portion within which absorption is achieved by the absorption filter. For example, the absorptive medium can include a layer (e.g., a liquid and/or a solid) that contains a dye or other absorptive additive. This layer can be contained within or adjacent to a non-absorptive medium. In other embodiments, the absorption filter includes a matrix material and an additive dispersed within the matrix material and configured to absorb one or more wavelengths of the light.

The integrated filter 30 and grating 32 can be made utilizing several manufacturing techniques. In one embodiment, a mold is provided having the shape of the surface features of the grating (e.g., the ridges 44 and grooves 46 of the surface). A thin film of aluminum is deposited onto the mold via evaporation in which a vacuum allows vaporous aluminum particles to coat the mold. A clear layer of epoxy is then distributed onto the aluminum coating within the mold. A layer of glass is placed over the clear layer of epoxy. This yields the grating portion of the device 20, including the layer of glass 36, the layer of clear epoxy 40, and the layer of aluminum to provide reflection and diffraction. The molded structure can be removed from the mold, and cut or broken to shape (after adding the filter portion, described below). The mold can then be reused for subsequent grating creation. The molded structure can be flipped such that the aluminum layer is prepared to interact with a red-dyed epoxy, as described below.

Next, the filter portion of the integrated grating and filter device 20 is formed. A layer of red-dyed epoxy is poured or otherwise dispensed directly to the aluminum layer of the previously-formed grating. The red-dyed epoxy binds to the layer of aluminum, filling the grooves 46 and forming a solid continuous bonding layer. A layer of glass is then placed over, and optionally pressed onto, the red-dyed epoxy. The entire structure is allowed to cool and set. Once the entire structure is set, the integrated grating and filter device 20 is formed, including the red-dyed epoxy providing a filter 30 in contact with an aluminum layer held between two glass substrates 34, 36. The final formed integrated grating and filter device 20 can have dimensions of approximately one inch in height by one inch in width by 0.125 inch in thickness. This is but one example of the dimensions of the device 20.

It should be understood that the method of manufacturing the integrated grating and filter device 20 described above is merely exemplary. Of course, if different materials or arrangements are desired in the device 20, the manufacturing method can be correspondingly altered to produce the desired final structure.

FIGS. 3-4 illustrate the filter 30 and grating 32 as being separate but integrated elements that are bonded or otherwise secured to one another in a contacting manner. However, it is contemplated that the filter 30 and grating 32 can be formed of a unitary material. For example, the filter 30 may be a formed of a glass, polymer, ceramic, or other material and may comprise an absorptive additive such as a dye. In one embodiment, grating features may be formed onto one side of the filter, thereby forming a unitary integrated grating and filter in which the grating and filter are both defined by one layer of a single material. In other embodiments, the grating features may be embossed into or deposited onto a surface of the filter.

In any of the above embodiments, it should be understood that the materials of the integrated grating and filter device 20 are merely exemplary and are not intended to be limited. For example, either or both layers of glass 34, 36 may instead be of ceramic, silicon, plastic, or composite materials (e.g., combinations of polymers, metals, glass, and/or ceramics). Rather than aluminum, the surface of the grating 32 may comprise nickel, copper, titanium, chromium, gold, silver, other reflective metals, or a non-metal material suitable for reflection and diffraction.

FIGS. 5-8 illustrate the effects that the integrated grating and filter device 20 has on daylight as well as light produced from the laser diode.

Figure 5:
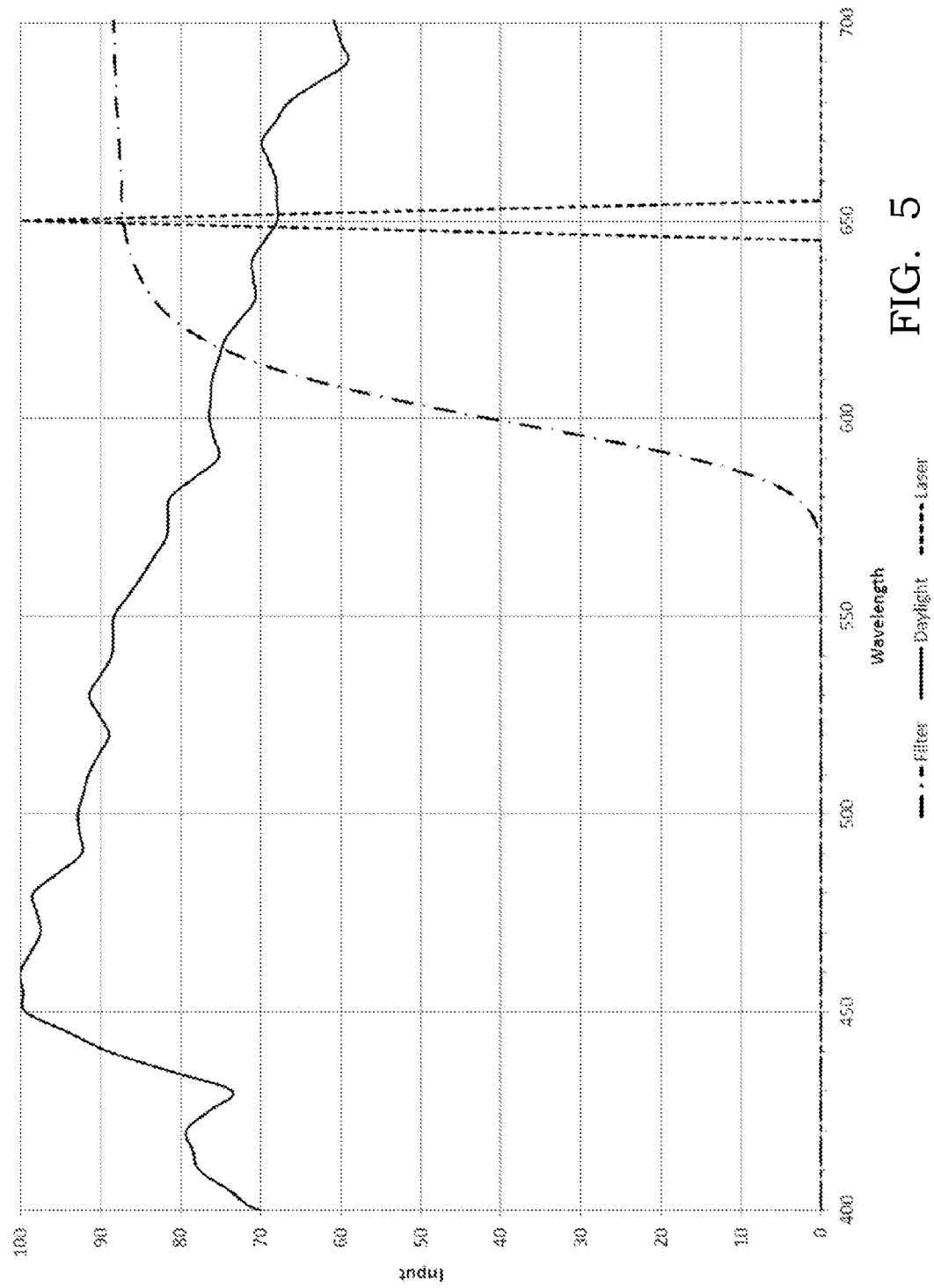
FIGS. 5-8 are graphical representations of one exemplary filter integrated with the grating and its effect on daylight and the laser light according to one embodiment.

FIG. 5 shows the input of daylight and the laser light into the sight 10. The characteristics of the filter are also illustrated. In the example shown in FIG. 5, the filter is a red-dyed epoxy that effectively inhibits all visible light having a wavelength of less than approximately 575 nm from transmitting therethrough. The particular filter exemplified in FIG. 5 allows for the passage of red light (e.g., ~650 nm) that is produced by the laser diode and present in the ambient light. Of course, it should be appreciated that the filter can alternatively include a dye of a different color to allow the reflection of other wavelength ranges.

Figure 6:
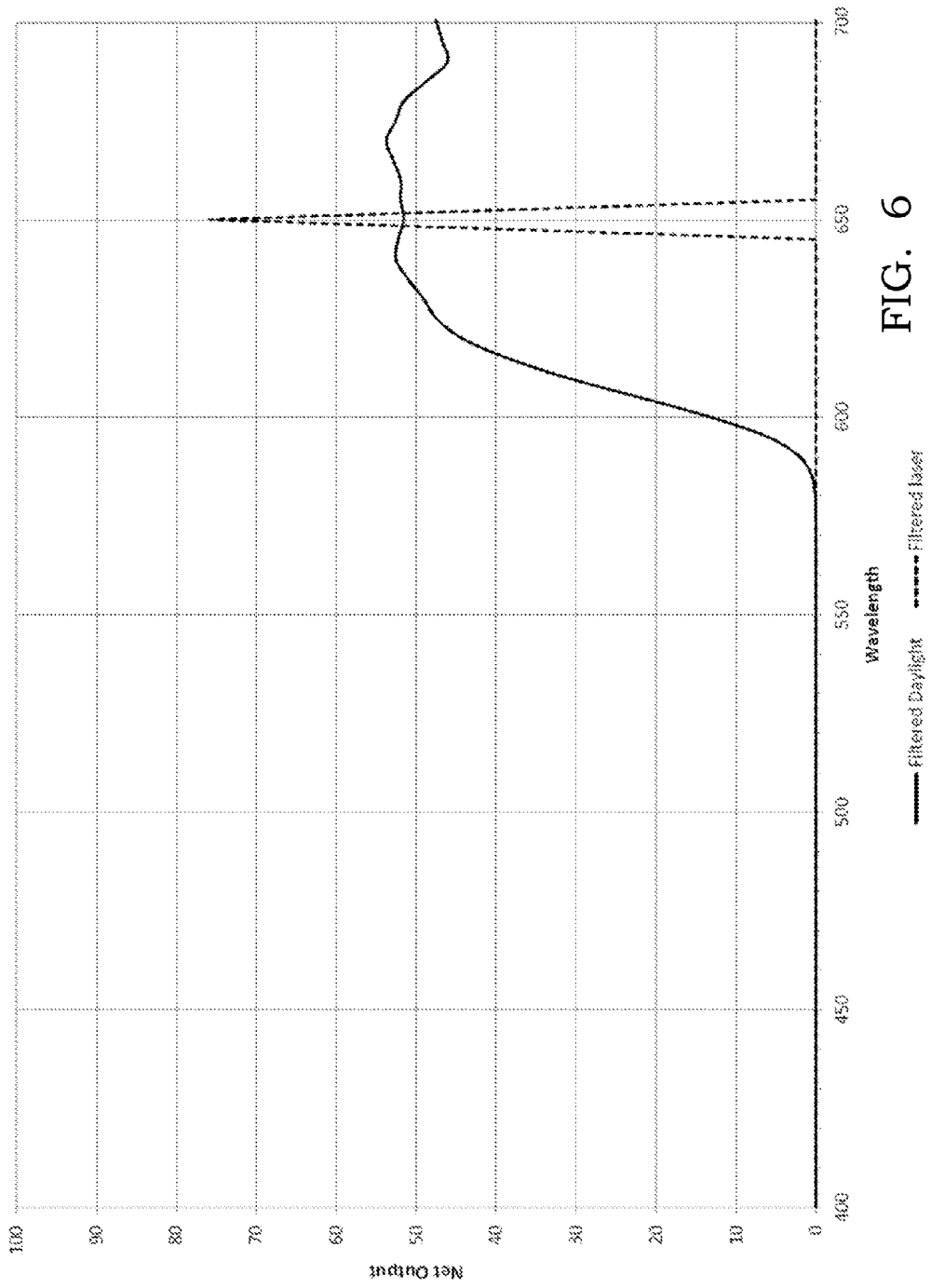

FIG. 6 illustrates the effect of the filter on the daylight and the light emitting from the laser diode. As can be seen, the portions of the daylight having wavelengths less than approximately 575 nm are effectively filtered and inhibited from reflecting from the integrated grating and filter device 20. The wavelengths of daylight above 575 nm are reduced by approximately 30% due to the characteristics of the filter (shown in FIG. 5). The red light emitting from the laser diode is also reduced as it travels through the filter.

Figure 7:
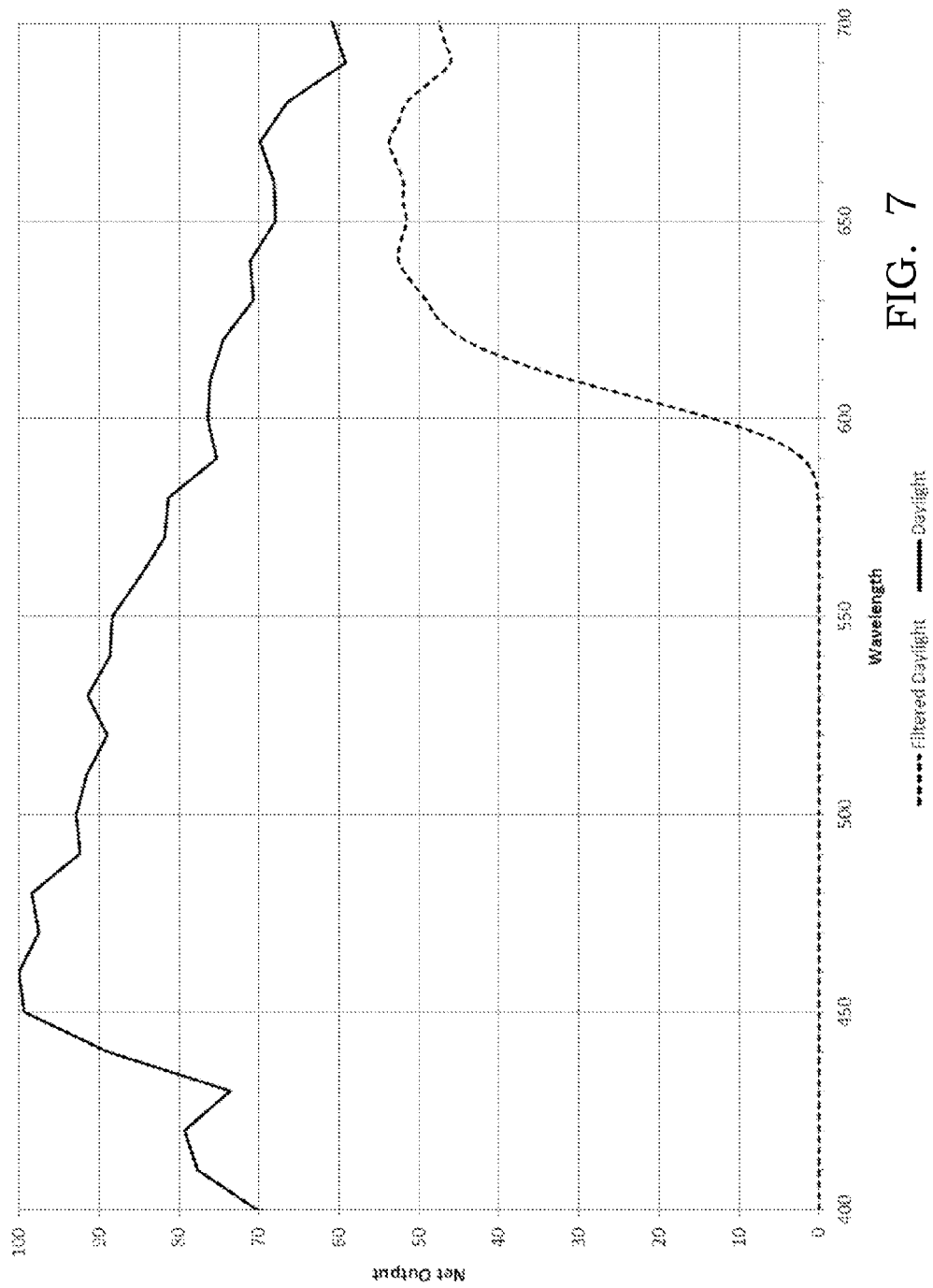

FIG. 7 illustrates a comparison between unfiltered daylight and filtered daylight. Because of the integrated grating and filter device 20, the entire spectrum of visible light up to approximately 575 nm is filtered and is unable to reflect to the user or otherwise exit the sight. This eliminates any "rainbow glare" that may be realized by a user of the sight in which unfiltered daylight could otherwise diffract and reflect back to the user, impeding the vision of the user.

Figure 8:
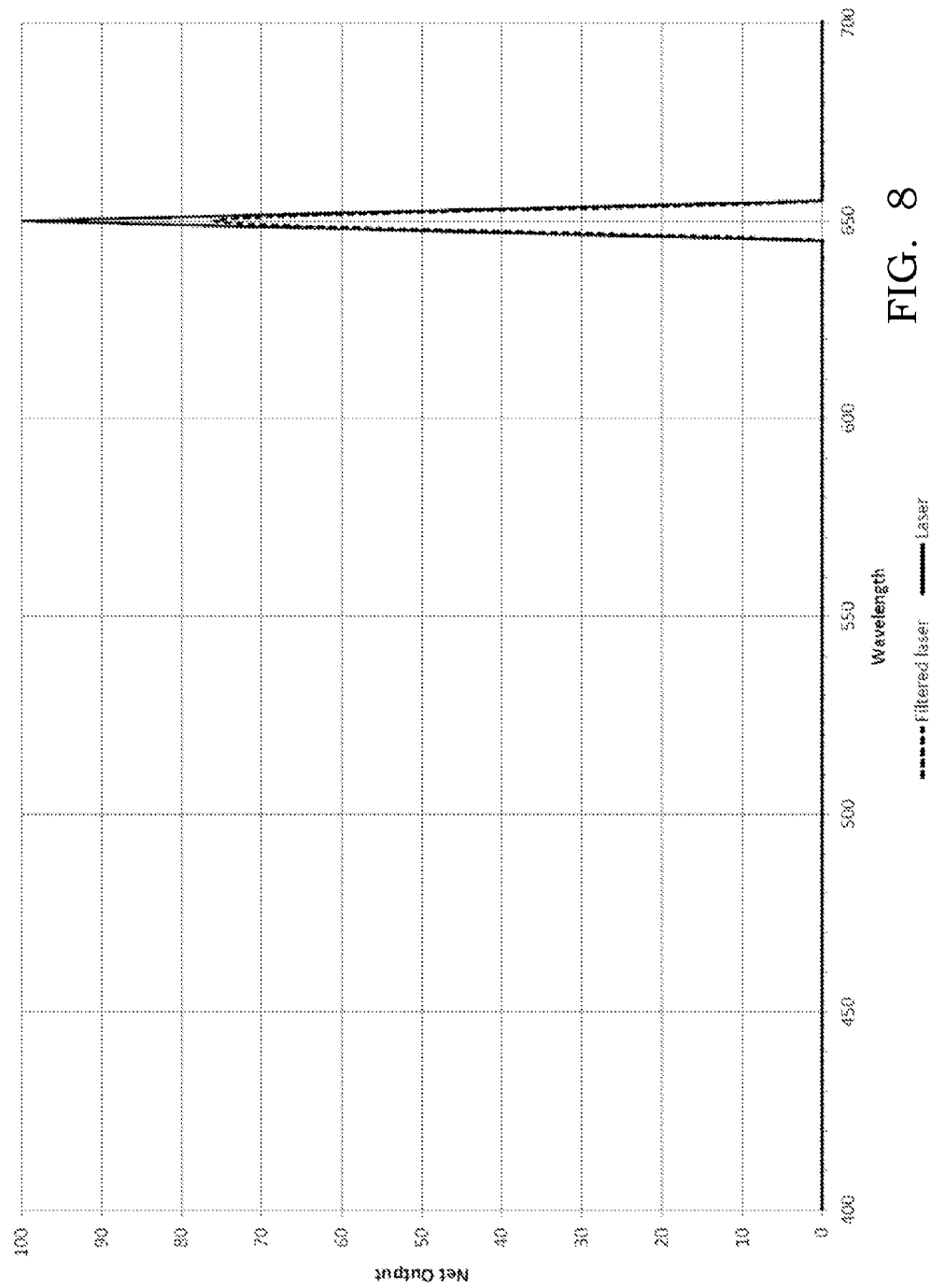
Figure 9:
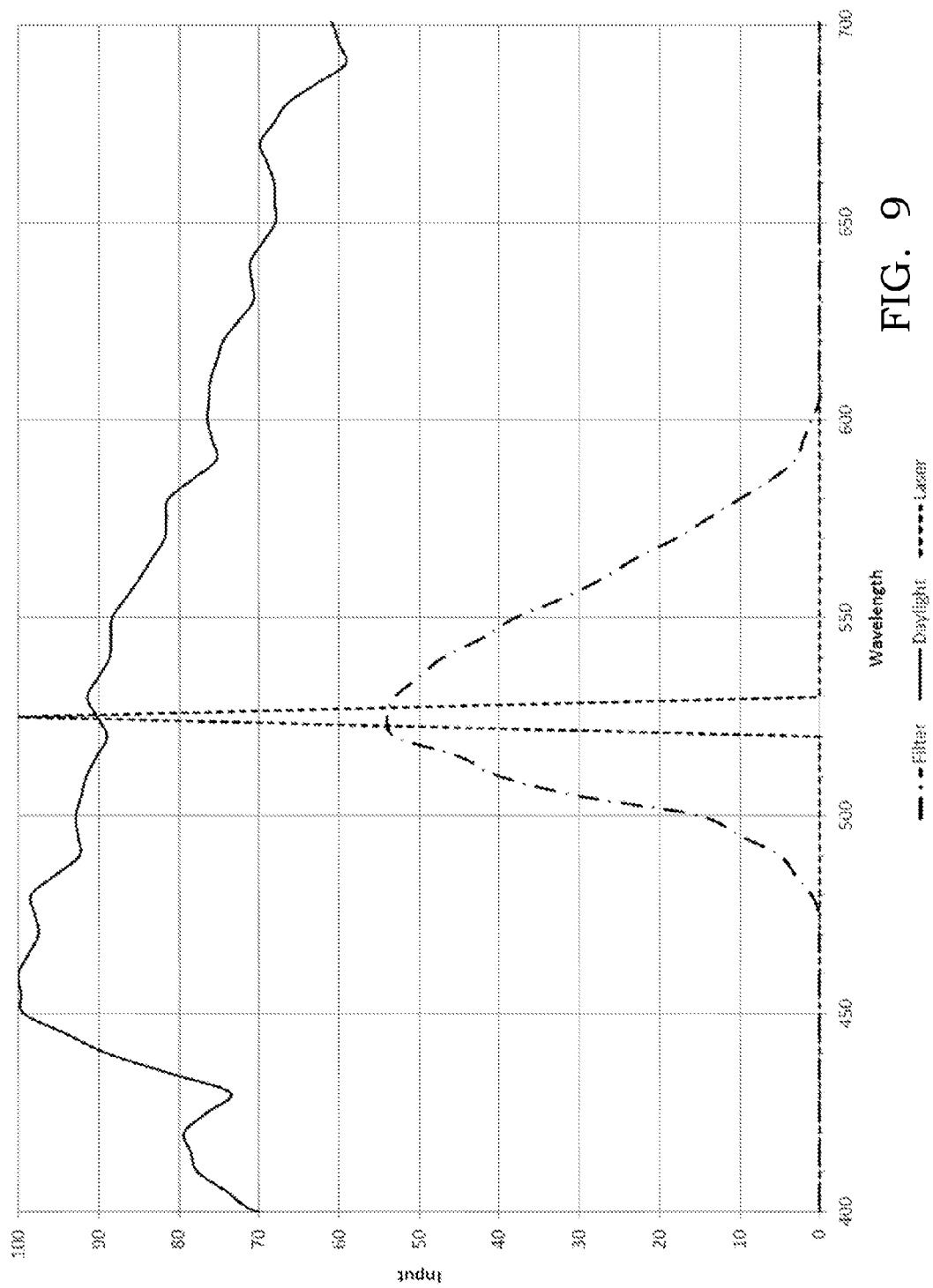
FIGS. 9-12 are graphical representations of another exemplary filter integrated with the grating and its effect on daylight and the laser light according to another embodiment.
Figure 10:
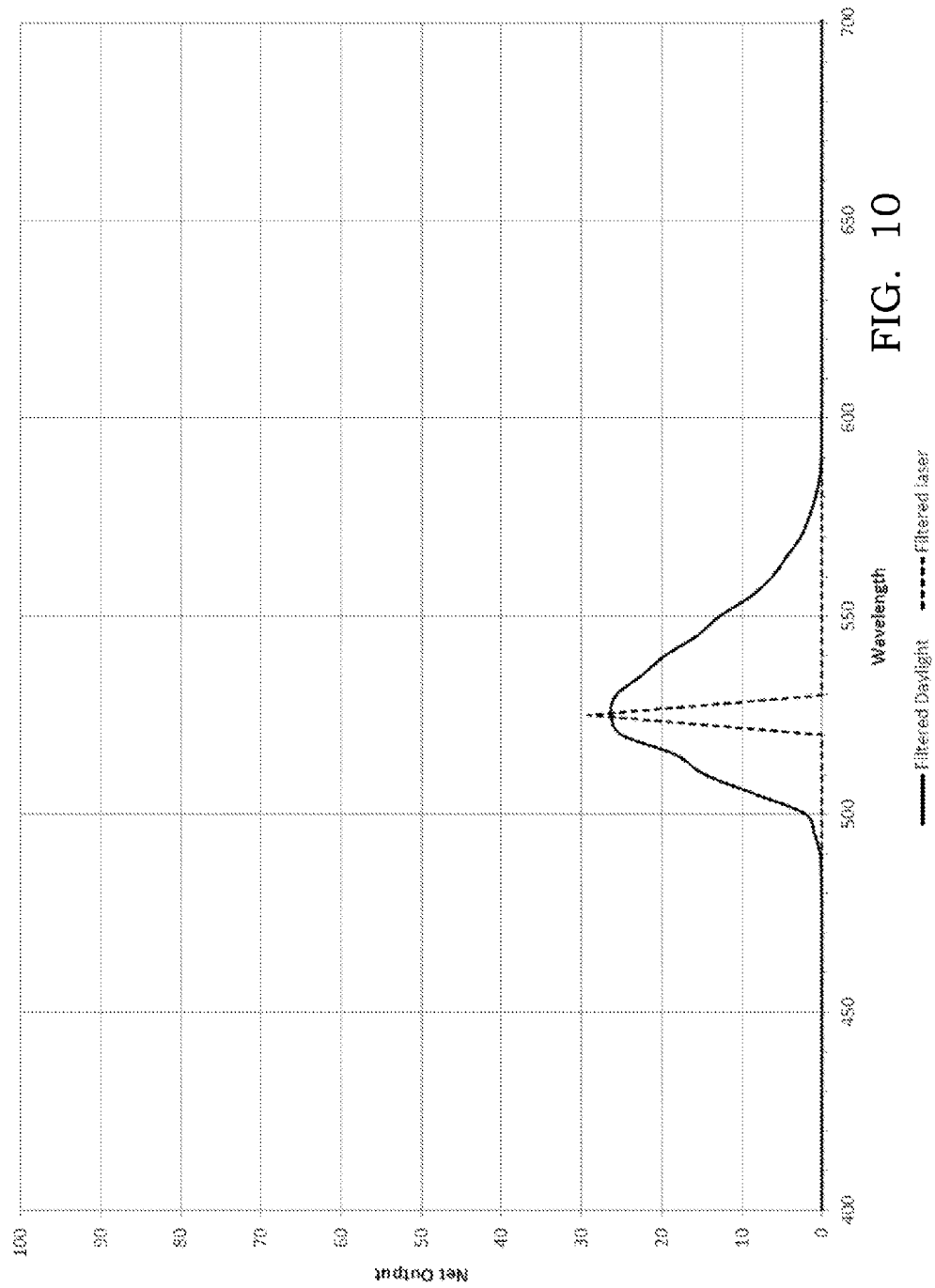
Figure 11:
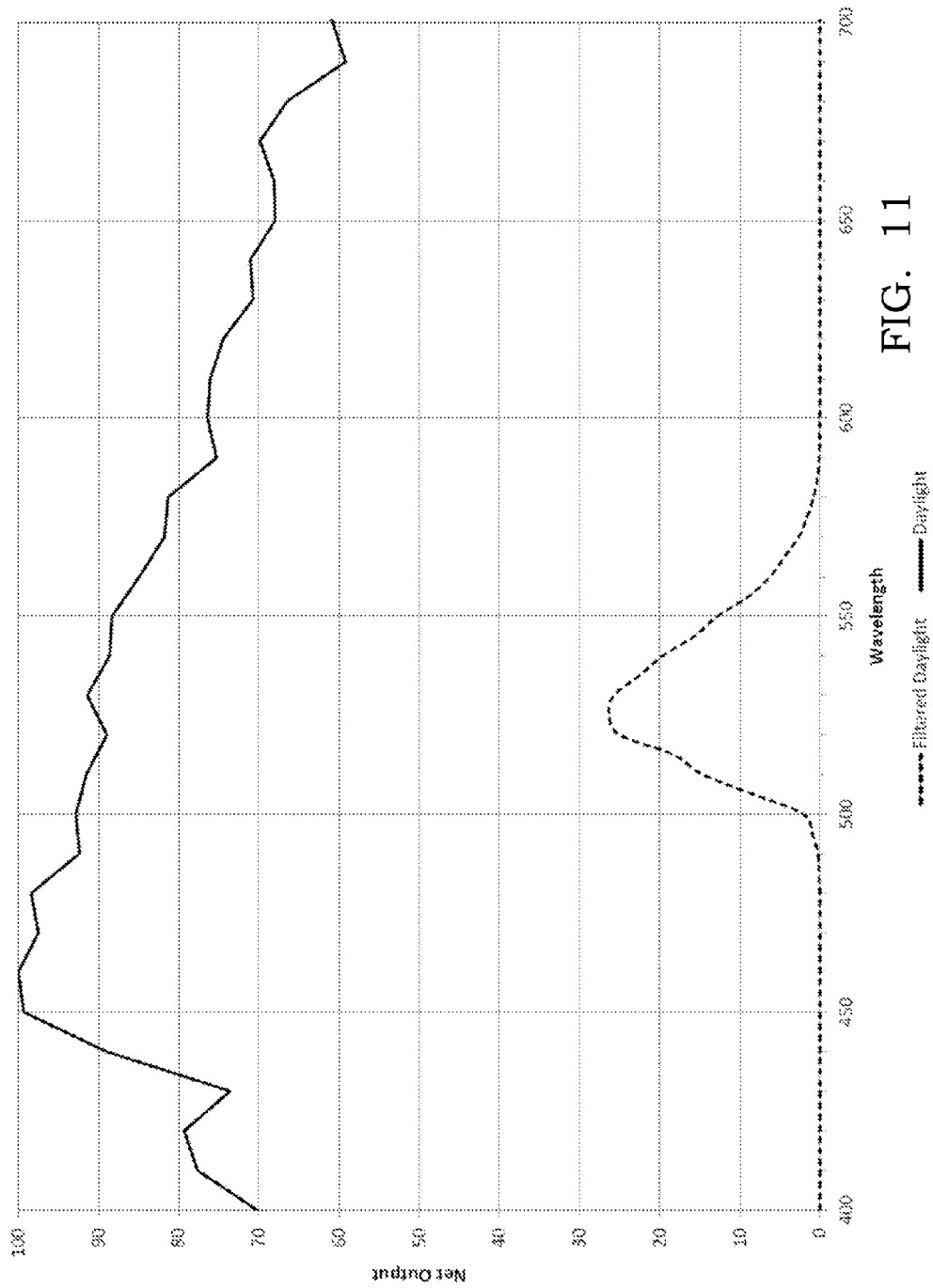
Figure 12:
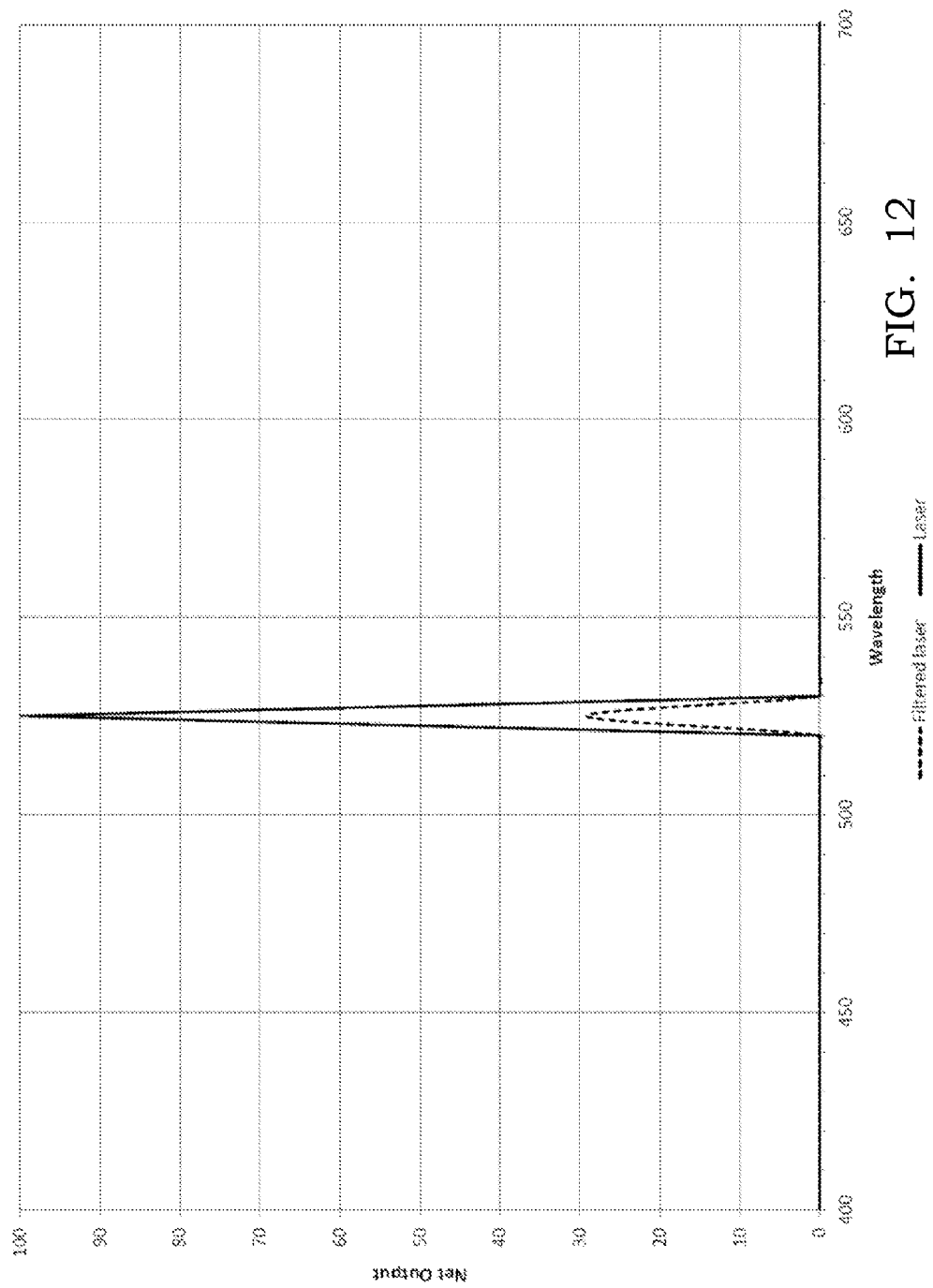

FIG. 8 illustrates a comparison between the unfiltered laser light and the filtered laser light. The entire spectrum of color produced by the laser (e.g., red) remains visible but is reduced in intensity due to the (red) filter.

As described above, the integrated grating and filter device 20 can be interchanged with another integrated device having different filtering characteristics. For example, a green-dyed epoxy can be utilized instead of a red-dyed epoxy. The effects of a green filter on daylight and a green laser light are illustrated in FIGS. 9-12, similar to the effects illustrated in FIGS. 5-8. The green filter used to produce the results of FIGS. 9-12 effectively inhibits all visible light having wavelengths outside of a range of 475 nm-610 nm from transmitting through the filter.

As can be seen by the Figures described above, the integrated grating and filter device 20 filters all incident light in a structurally-compact manner. The single integrated device can be interchanged with other integrated devices with different filter characteristics. A sight with this device is provided with a reduction of the negative effects of ambient light (such as glare) in a weapon sight without increasing the size of the sight or the necessity to redesign the sight to implement a filter device separated from the grating.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A holographic weapons sight comprising:
    a reticle image hologram; and
    an integrated grating and filter device containing:
        a base substrate,
        a transparent substrate spaced from the base substrate,
        a first epoxy between the substrates and contacting the base substrate, wherein the first epoxy includes an outer surface having a series of surface features molded thereon,
        a reflective coating contacting the outer surface of the first epoxy and configured to diffract light toward the hologram, and
        a dyed epoxy between the reflective coating and the transparent substrate, wherein the dyed epoxy is adapted to inhibit at least a portion of the light from reflecting to the hologram.

2. The holographic weapons sight of claim 1 wherein the surface features, the reflective coating, and the dyed epoxy each include a series of ridges and grooves, wherein the ridges and grooves of the reflective coating contact the ridges and grooves of both the transparent epoxy and the dyed epoxy.

3. The holographic weapons sight of claim 1 wherein the dyed epoxy is dyed red and is adapted to inhibit light having a wavelength of approximately less than 575 nm from passing through the dyed epoxy.

4. The holographic weapons sight of claim 1 wherein the reflective coating is a layer of metal.

5. The holographic weapons sight of claim 1 wherein the base substrate is transparent.

6. The holographic weapons sight of claim 1 wherein the first epoxy is transparent.

7. The holographic weapons sight of claim 1 further comprising a laser diode for emitting a light beam, a mirror configured to reflect the light beam, a collimator configured to collimate the light from the light beam toward the integrated grating and filter device.

8. A holographic sight comprising:
    a laser diode for emitting a light beam;
    a diffraction grating having a grating surface configured to diffract the light beam and diffract ambient light; and
    an optical filter adjacent to the grating surface and adapted to absorb at least one wavelength of the ambient light;
    wherein the diffraction grating includes a layer of epoxy and a layer of reflective metal bonded to at least a portion of the epoxy.

9. The holographic sight of claim 8 wherein the optical filter directly contacts the grating surface of the diffraction grating.

10. The holographic sight of claim 8 wherein the optical filter and the diffraction grating are an integrated unit.

11. The holographic sight of claim 8 wherein the optical filter is adapted to absorb the at least one wavelength of ambient light prior to the ambient light transmitting to the grating surface of the diffraction grating.

12. The holographic sight of claim 8 wherein the epoxy includes a series of molded ridges and grooves directly contacting the layer of reflective metal.

13. The holographic sight of claim 12 wherein the optical filter includes a dyed-epoxy directly contacting the layer of reflective metal opposite the epoxy.

14. The holographic sight of claim 13 wherein the optical filter and the diffraction grating are disposed between opposing layers of glass.

15. A holograph sight comprising:
    a laser diode for emitting a light beam;
    a collimator that collimates light emitted from the light beam;
    a reflective diffraction grating having a grating surface for diffracting the collimated light; and
    a filter contacting at least a portion of the grating surface;
    wherein the reflective diffraction grating includes a layer of reflective material and the filter includes a dyed transparent material contacting the layer of reflective material.

16. The holograph sight of claim 15 wherein the reflective diffraction grating and filter are integrated as a unitary device.

17. The holograph sight of claim 16 wherein the unitary device including the reflective diffraction grating and filter is disposed between two opposing layers of glass.

18. The holograph sight of claim 15 wherein the dyed transparent material is bonded to a first glass substrate, and wherein the reflective diffraction grating includes a molded epoxy bonding the layer of reflective material to a second glass substrate.

* * * * *